(12) United States Patent
Okamoto et al.

(10) Patent No.: US 6,743,376 B2
(45) Date of Patent: Jun. 1, 2004

(54) LIQUID-CRYSTALLINE RESIN COMPOSITION AND MOLDING

(75) Inventors: Shin Okamoto, Tsukuba (JP); Manabu Hirakawa, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/941,717

(22) Filed: Aug. 30, 2001

(65) Prior Publication Data

US 2002/0053658 A1 May 9, 2002

(30) Foreign Application Priority Data

Sep. 5, 2000 (JP) ........................................ 2000-268084

(51) Int. Cl.[7] .............................................. C09K 19/52
(52) U.S. Cl. ................................................ 252/299.01
(58) Field of Search ....................... 252/299.01, 299.67, 252/299.64; 524/495; 523/214, 217; 428/378, 382, 383, 390

(56) References Cited

U.S. PATENT DOCUMENTS

| 5,690,859 | A  | * | 11/1997 | Takayanagi  | 252/299 |
| 6,017,834 | A  | * | 1/2000  | Ward et al. | 428/198 |
| 6,194,524 | B1 | * | 2/2001  | Nagashima et al. | 525/444 |
| 6,346,568 | B1 | * | 2/2002  | Maeda et al. | 524/495 |

FOREIGN PATENT DOCUMENTS

| JP | 2-208035  | 8/1990 |
| JP | 4-120162  | 4/1992 |
| JP | 7-233310  | 9/1995 |
| JP | 10-505109 | 5/1998 |

* cited by examiner

*Primary Examiner*—Mark F. Huff
*Assistant Examiner*—Jennifer R. Sadula
(74) *Attorney, Agent, or Firm*—Birch, Stewart, Kolasch & Birch, LLP

(57) ABSTRACT

A liquid-crystalline resin composition comprising 0.01 to 10 parts by weight of an ultra-high molecular weight polyethylene having a molecular weight of exceed 600,000 and 100 parts by weight of a liquid-crystalline resin that shows an anisotropic liquid-crystalline state in a molten state.

4 Claims, 1 Drawing Sheet

LIQUID-CRYSTALLINE RESIN COMPOSITION AND MOLDING

FIELD OF THE INVENTION

The present invention relates to a liquid-crystalline resin composition that is excellent in mold-releasing property when used for molding and that has decreased possibility of deformation or fracture when a molding is released from a mold and to a molding using the same.

BACKGROUND OF THE INVENTION

Liquid-crystalline resins comprise a poly-domain having a liquid-crystalline state without causing interlocking even in a molten state because of the rigidity of the molecule and show a behavior in which molecular chains are remarkably oriented in the flow direction due to shear during molding. Therefore, they are generally called melt liquid-crystal type (thermotropic liquid-crystal) polymers. Because of this special behavior, the liquid-crystalline resins have significantly good melt flowability. Depending on their molecular structures, they show a high deflection temperature under load and a high continuous-use temperature, and do not cause deformation or blistering when immersed in a molten solder at 260° C. or more.

Because of such reason, resin compositions in which a fiber reinforce material represented by glass fiber, an inorganic filler represented by talc and the like are filled in a liquid-crystalline resin are materials suitable for electric or electronic parts having a thin part or a complicated shape. For example, they are used for relay parts, coil bobbins, connectors, volume parts, motor parts such as commutator, separator or the like, or encapsulation for elements such as coil, quartz oscillator, IC tip or the like, and so on.

In the trend towards a light-thin-short-small in recent years, however, thinner and smaller shapes of products have become more strongly demanded, and many products have a thickness of 0.2 mm or less. In moldings having such thin part, molding is very difficult even for liquid-crystalline resins and molding defects such as short shot, flash and the like often occur. In order to avoid these defects, it has been necessary to increase injection rate or pressure. This requires higher pressure to be applied on a product upon removing the product from a mold, or on release from a mold. As a result, problems occasionally occur such as where the product is deformed or fractured on being released from a mold, depending on a shape of the product or the structure of a mold, resulting in size-precision failure of the product or a fractured piece formed during production being left in a mold. The latter produces significant decrease in productivity due to the need to temporarily stop production in order to remove the piece.

For solving these problems, attempts have generally been carried out such as use of a composition in which a lubricant is added to a resin and external addition of a lubricant to a resin. Examples of generally used lubricant include metal salts of aliphatic acids, aliphatic acid amides, lower molecular weight polyolefins and the like. JP-A 2-208035 discloses a method in which an aliphatic acid ester is added to a liquid-crystalline polyester; JP-A 4-120162 discloses a method in which a polyhydric alcohol or the like is added to a thermoplastic polyester; JP-A 10-505109 discloses a method in which a polyethylene having a molecular weight of 1,000 to 10,000 is added; and JP-A 7-233310 discloses a method in which an olefin polymer having a molecular weight of 10,000 to 600,000 is added.

In the case of resins having a high processing temperature like liquid-crystalline resins, however, the lubricants as described above are thermally decomposed or evaporated during processing. Therefore, sometimes physical properties are adversely affected, or no or insufficient effect is obtained. In addition, problems may occur that blisters are generated on the surface or inside part of a product during molding.

Accordingly, a purpose of the invention is to suppress the problems of size-precision failure due to deformation of the product during molding, decrease in productivity due to blister defect or fracture and the like, and to provide a liquid-crystalline resin composition excellent in mold-releasing property and a molding obtained using the same.

As the result of extensive studies conducted in order to solve the above-described problems, the present inventors have found that the above purpose can be attained by a composition in which an ultra-high molecular weight polyethylene having a molecular weight of a specific value or more is added to a liquid-crystalline resin, and successfully have completed the invention.

SUMMARY OF THE INVENTION

Therefore, the invention provides a liquid-crystalline resin composition comprising 0.01 to 10 parts by weight of an ultra-high molecular weight polyethylene having a molecular weight in excess of 600,000 and 100 parts by weight of a liquid-crystalline resin that exhibits an anisotropic liquid-crystalline state in a molten state.

The invention also provides a molding obtained by molding the above-described liquid-crystalline resin composition.

Figure 1:
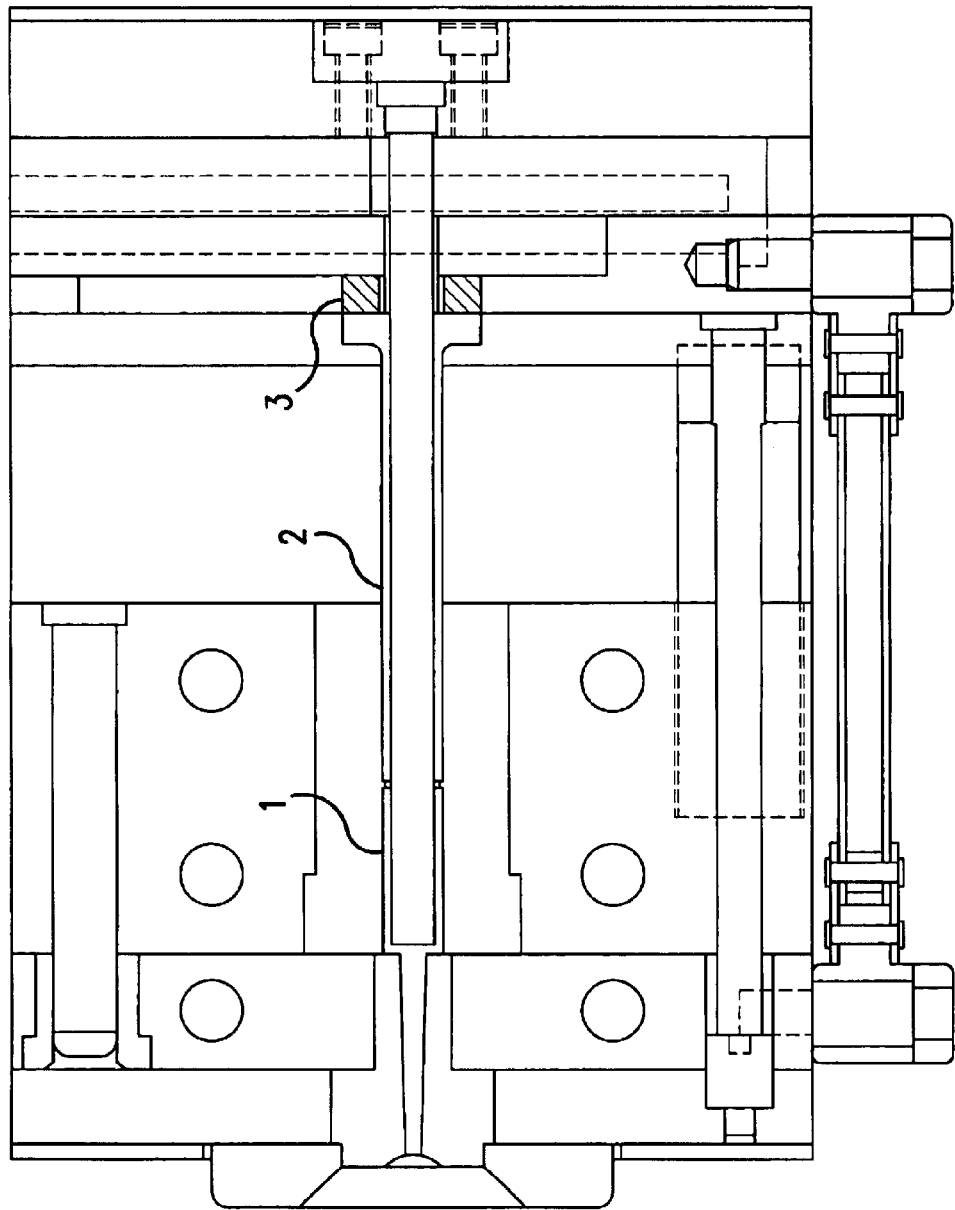
FIG. 1 shows a general view of a mold used in the measurement of mold-releasing resistance carried out in Examples and Comparative Examples.

1: Moldings
2: Ejector pin
3: Pressure sensor

DETAILED DESCRIPTION OF THE INVENTION

The liquid-crystalline resin composition of the invention comprises a specific amount of an ultra-high molecular weight polyethylene added to a liquid-crystalline resin that shows an anisotropic liquid-crystalline state in a molten state.

The liquid-crystalline resin used in the liquid-crystalline resin composition of the invention is a polymer called the thermotropic liquid-crystalline polymer and is desirably a resin that forms an anisotropic melt at a temperature of 400° C. or below.

Repeating units in said liquid-crystalline resin include, but are not limited to, repeating units derived from aromatic hydroxycarboxylic acids represented by the formula shown below, wherein $X_1$ represents a halogen atom or an alkyl group; repeating units derived from aromatic dicarboxylic acids represented by the formula shown below, wherein $X_2$ represents a halogen atom, an alkyl group or an aryl group; and repeating units derived from aromatic diols represented by the formula shown below, wherein $X_2$ represents a halogen atom, an alkyl group or an aryl group, and $X_3$ represents a hydrogen atom, a halogen atom or an alkyl group:

Repeating units derived from aromatic hydroxycarboxylic acids:
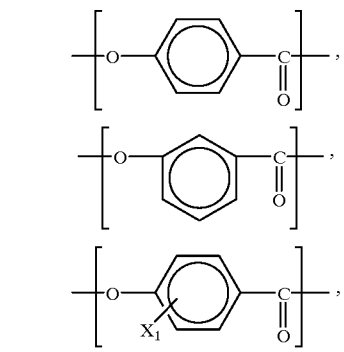
(A₁)
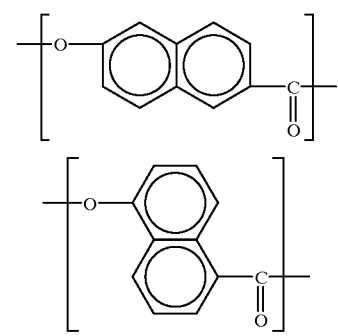
(A₂)
Repeating units derived from aromatic dicarboxylic acids:
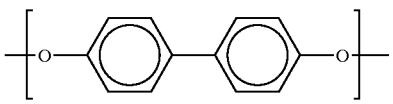
(B₁)
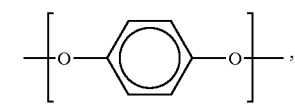
(B₂)
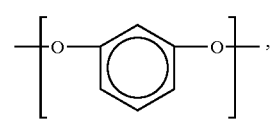
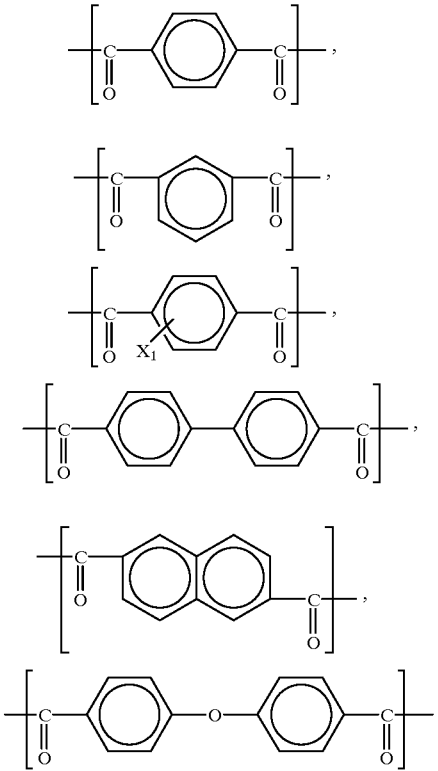
(B₃)
-continued
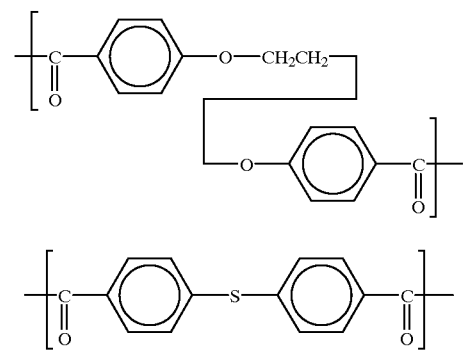
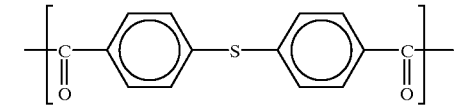
Repeating units derived from aromatic diols:
(C₁)
(C₂)
(C₃)
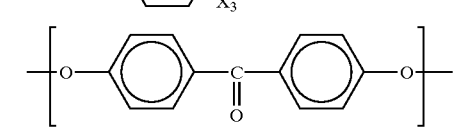
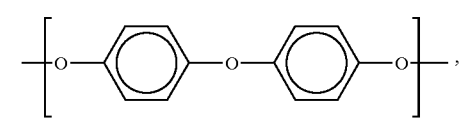
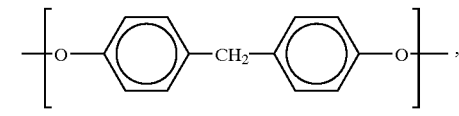
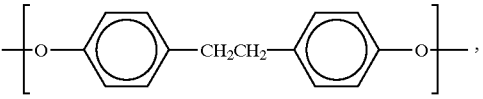

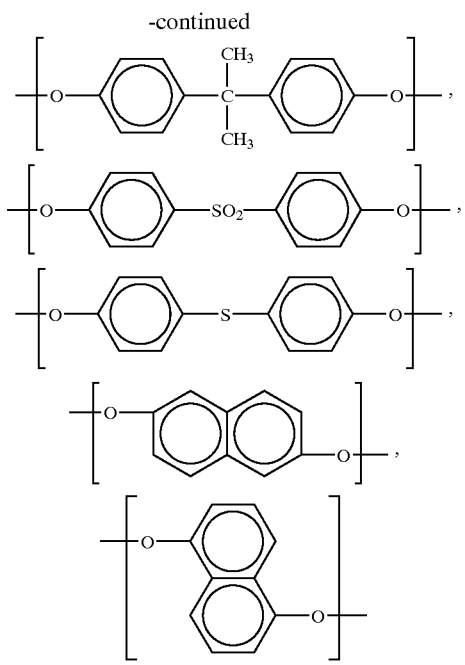

In the above-described liquid-crystalline resins, preferred liquid-crystalline resins contain at least 30% by mole of a repeating unit represented by the formula $A_1$ as described above from the viewpoint of a balance between heat resistance, mechanical properties and processability.

In addition, the above-described liquid-crystalline resins are preferably liquid-crystalline resins that show a flow temperature of 260 to 400° C. at a melt viscosity of 48,000 poise, when the resin melted by heating is extruded from a nozzle at a heat-up rate of 4° C./minute under a load of 100 kg/cm² using a capillary rheometer with a nozzle having an inside diameter of 1 mm and a length of 10 mm. When the flow temperature is less than 260° C., the heat resistance of the resin is not sufficient, and when the temperature exceeds 400° C., the flowability is low and there is a possibility of occurring problems in molding. Therefore, these cases are not preferred.

Preferred combinations of repeating units are combinations in which $(A_1)$ and $(A_2)$, $(B_1)$ to $(B_3)$ and $(C_1)$ to $(C_3)$ are combined according to the following formulations (a) to (f):

(a): $(A_1)$, $(B_1)$ or a mixture of $(B_1)$ and $(B_2)$, $(C_1)$;
(b): $(A_1)$, $(A_2)$;
(c): the combination of (a) wherein a part of $(A_1)$ is replaced by $(A_2)$;
(d): the combination of (a) wherein a part of (B1) is replaced by (B3);
(e): the combination of (a) wherein a part of $(C_1)$ is replaced by $(C_3)$; and
(f): the combination of (b) to which the structural units of $(B_1)$ and $(C_2)$ are added.

The liquid-crystalline resins of (a) and (b) described above, which are the basic structures, are disclosed in JP-B-Sho47-47870 and JP-B-sho63-3888, respectively.

The above-described liquid-crystalline resins can be obtained according to conventional processes. In addition, commercially available liquid-crystalline resins, for example various grades of Sumikasuper LCP, trade name, manufactured by Sumitomo Chemical Co., Ltd., can also be used.

The ultra-high molecular weight polyethylene used in the liquid-crystalline resin composition of the invention should have a molecular weight in excess of 600,000. It preferably has a molecular weight in excess of 800,000 and more preferably a molecular weight in excess of 1,000,000. Such a polyethylene may be a commercially available product. Examples include grades having a molecular weight in excess of 600,000 among grades of Million, trade name, manufactured by Mitsui Chemicals, Inc.

While commercially available ultra-high molecular weight polyethylene include various grade having different particle sizes and shapes according to use, the particle sizes and shapes of ultra-high molecular weight polyethylenes do not influence the effect for the use of the invention. Depending on types of kneading machines used for addition to the liquid-crystalline resin, however, shapes of the ultra-high molecular weight polyethylenes are desirably flakes, powders, pellets or the like.

In the invention, the molecular weight referred to in the above-described ultra-high molecular weight polyethylene is a value calculated according to the following method:

An aliquot of an ultra-high molecular weight is dissolved in decalin to form a test solution of about 0.03 g/dl. The flow-down time in seconds (t) of the test solution at 130° C. is measured with an Atlantic type viscometer. The specific viscosity $\eta_{sp}$ is calculated from the obtained flow-down time in seconds (t) and the flow-down time in seconds of a blank solvent (decalin) ($t_0$) according to the equation (1) described below. The intrinsic viscosity [η] is calculated from the obtained specific viscosity $\eta_{sp}$ and the concentration of the sample C (g/dl) according to the equation (2) shown below, and the molecular weight Mv is calculated from the intrinsic viscosity [η] according to the equation (3) shown below.

$$\text{Specific viscosity } \eta_{sp}=(t-t_0)/(t_0) \quad (1)$$

wherein t is the flow-down time in seconds of the test solution and $t_0$ is the flow-down time in seconds of the blank solvent (decalin).

$$\text{Intrinsic viscosity } [\eta]=\eta_{sp}/C(1+K\eta_{sp}) \quad (2)$$

wherein K is 0.28, $\eta_{sp}$ is specific viscosity and C is the concentration of the sample (g/dl).

$$\text{Molecular weight } Mv=5.37\times10^4\times[\eta]^{1.37}$$

In the liquid-crystalline resin composition of the invention, the amount to be added of the above-described ultra-high molecular weight polyethylene is 0.01 to 10 parts by mass and preferably 0.1 to 1.0 parts by mass. When the amount is less than 0.01 parts by mass or more than 10 parts by mass, it is difficult to obtain the desired effect.

Various reinforce materials and additives as well as a small amount of other resin materials can be added to the liquid-crystalline resin composition of the invention, as far as the purpose of the invention is not deteriorated. The amount of addition can be decided by suitably selecting according to the desired effect.

Examples of various reinforcing materials and additives include fibrous reinforcing materials such as glass fiber, silica-alumina fiber, alumina fiber, carbon fiber and the like; needle-like reinforcing materials such as aluminum borate whisker, potassium titanate whisker and the like; inorganic fillers such as glass beads, talc, mica, graphite, wollastonite, dolomite and the like; slipping property improvement agent such as fluorine resins; coloring agents such as dyes, pigments and the like; antioxidants; thermal stabilizers; ultraviolet absorbers; antistatics; surfactants and so on. On application, these can be used independently or in admixture. In addition, it is possible to add one or more compounds having an external lubricant activity such as higher aliphatic acids, higher aliphatic acid esters, metal salts of higher aliphatic acids, fluorocarbon surfactants and the like.

Examples of the above resin materials include thermoplastic resins such as polyamides, polyesters, polyphenylene sulfides, polyether ketones, polycarbonates, polyphenylene ethers and their modification products, polysulfones, polyether sulfones, polyether imides and the like; thermosetting resins such as phenol resins, epoxy resins, polyimide resins and the like; and so on. On application, these can be used independently or in admixture.

In the liquid-crystalline resin composition of the invention, means for mixing raw materials are not limited. For example, the above liquid-crystalline resin materials and the ultra-high molecular weight polyethylene as the essential ingredients as well as various ingredients, if necessary, such as a reinforcing material such as glass fiber, talc, aluminum borate whisker, an inorganic filler, releasability improving agent, thermal stabilizer and the like, can be introduced independently into a melt-mixer, or these materials can be pre-mixed in a mortar, Henschel mixer, ball mill, ribbon blender and then fed to a melt-mixer.

The moldings of the invention can be obtained by molding the above-described liquid-crystalline resin composition. The molding can be performed suitably according to known methods depending on desired uses.

Examples of the moldings on the invention suitably include, but are not limited to, electric and electronic parts (switches, relays, connectors, sockets and the like); encapsulation for electric and electronic parts and elements including light-emitting diodes, transistors, integrated circuits and the like; office automation and audio visual machines (casings and working parts of printers, copiers, facsimiles, video players, video cameras, floppy disk drives, hard disk drives, CD-ROM drives, magnet-optical disk drives and the like); other working parts (still cameras, cooking heaters using ultrasonic waves, car parts) and so on.

EXAMPLES

The invention will now be described in more detail with reference to Examples and Comparative Examples, which should not be construed as a limitation upon the scope of the invention.

Examples 1–4 and Comparative Examples 1–7

Using "Sumikasuper LCP E6000", trade name, manufactured by Sumitomo Chemical Co., Ltd., which was a liquid-crystalline resin containing 60% by mole of the structural unit represented by the above-described formula ($A_1$) and the flow temperature of 323° C. at a melt viscosity of 48,000 poise, when the resin melted by heating was extruded from a nozzle at a heat-up rate of 4° C./minute under a load of 100 kg/cm$^2$ using a capillary rheometer with a nozzle having an inside diameter of 1 mm and a length of 10 mm as the liquid-crystalline resin, a milled glass fiber manufactured by Central Glass Ltd. as the glass fiber, various grades of "Hi-Wax", "Hi-Zex" or "Million", trade name, manufactured by Mitsui Chemicals, shown in Table 1, as the polyethylene, each of compositions shown in Table 1 was mixed with a Henschel mixer. The molecular weights of "Hi-Wax", trade name, and of "Hi-Zex", trade name, used in the Comparative Examples were weight average molecular weights measured by viscosity method and GPC method, respectively. Subsequently, compositions were granulated at a cylinder temperature of 340° C. using a twin-screw extruder (model PCM-30, manufactured by Ikegai Corp.)

Then samples of the obtained compositions were molded with an injection-molding machine (model UH-1000, manufactured by Nissei Plastic Ind. Co., Ltd.) and a mold for measuring mold-releasing resistance shown in FIG. 1 at a cylinder temperature of 350° C. and a mold temperature of 130° C. at a constant injection rate. A pressure required for taking out the moldings was measured and taken as the mold-releasing resistance. In addition, small pieces for tensile test (type 1(½)) provided in JIS K7113 were molded with a molding machine (model PS40 E5 ASE, manufactured by Nissei Plastic Ind. Co., Ltd.) and visually observed for any presence of blister. The results are shown in Table 1. Evaluation of blistering was made on the basis of scores: ○, no blister; Δ, slight blister; ×, blister.

As it can be clearly understood from Table 1, the compositions in which polyethylene were added had mold-releasing resistances remarkably lower than those of compositions without polyethylene. In addition, it was revealed that good moldings could be obtained from the compositions in which polyethylene having a high molecular weight was added without blister during molding.

TABLE 1

| | Liuid-crytal-line resin (parts by mass) | Glass fiber (parts by mass) | Polyethylene | | | Mold-releasing resistance (MPa) | Score of blister |
|---|---|---|---|---|---|---|---|
| | | | Name | Amount (parts by mass) | Molecular weight | | |
| Example 1 | 100 | 66.7 | Million 145M | 0.8 | 1000000 | 0.3 | ○ |
| Example 2 | 100 | 66.7 | Million 240S | 0.8 | 2100000 | 2.3 | ○ |
| Example 3 | 100 | 66.7 | Million 340M | 0.8 | 3600000 | 0.2 | ○ |
| Example 4 | 100 | 66.7 | Million 630M | 0.8 | 5750000 | 5.8 | ○ |
| Comparative example 1 | 100 | 66.7 | Nothing | 0 | — | 50.4 | ○ |
| Comparative example 2 | 100 | 66.7 | Hi-Wax 200P | 0.8 | 2000 | 10.2 | X |
| Comparative example 3 | 100 | 66.7 | Hi-Wax 800P | 0.8 | 8000 | 7.1 | X |
| Comparative example 4 | 100 | 66.7 | Hi-Zex 2100JP | 0.8 | 60000 | 4.1 | X |
| Comparative example 5 | 100 | 66.7 | Hi-Zex 3330JP | 0.8 | 100000 | 4.4 | X |

TABLE 1-continued

| | Liuid-crytal-line resin (parts by mass) | Glass fiber (parts by mass) | Polyethylene Name | Amount (parts by mass) | Molecular weight | Mold-releasing resistance (MPa) | Score of blister |
|---|---|---|---|---|---|---|---|
| ample 5 | | | | | | | |
| Comparative example 6 | 100 | 66.7 | Hi-Zex 7000JP | 0.8 | 200000 | 3.8 | X |
| Comparative example 7 | 100 | 66.7 | Million 03S | 0.8 | 490000 | 2.8 | Δ |

In virtue of adding a specific amount of an ultra-high molecular weight polyethylene to a liquid-crystalline resin, the liquid-crystalline resin composition of the invention is excellent in mold-releasing property when used for molding and has a less possibility of deformation or fracture when a molding from it is released from a mold. In addition, it has fewer tendencies to blistering during molding and therefore moldings can be produced steadily.

What is claimed is:

1. A liquid-crystalline resin composition comprising 0.01 to 10 parts by weight of an ultra-high molecular weight polyethylene having a molecular weight in excess of 600,000 and 100 parts by weight of a liquid-crystalline resin that exhibits anisotropic liquid-crystalline properties in a molten state.

2. The liquid-crystalline resin composition according to claim 1, wherein the liquid-crystalline resin comprises at least 30% by mole of a repeating unit represented by the formula $A_1$:

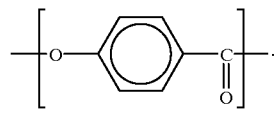

$(A_1)$

3. The liquid-crystalline resin composition according to claim 1, wherein the liquid-crystalline resin is a liquid-crystalline resin which exhibits a flow temperature of 260 to 400° C. at a melt viscosity of 48,000 poise, when the melt resin is extruded from a nozzle at a heat-up rate of 4° C./minute under a load of 100 kg/cm² using a capillary rheometer with a nozzle having an inside diameter of 1 mm and a length of 10 mm.

4. A molding obtained by molding the liquid-crystalline resin composition according to claim 1.

* * * * *